US012759613B2

(12) United States Patent
Gradl et al.

(10) Patent No.: US 12,759,613 B2
(45) Date of Patent: Oct. 13, 2026

(54) TELESCOPIC STEERING COLUMN FOR A MOTOR VEHICLE

(71) Applicant: AUDI AG, Ingolstadt (DE)

(72) Inventors: Michael Gradl, Gaimersheim (DE); Richard Schroeder, Ingolstadt (DE); Nicolas Stein, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 19/157,897

(22) PCT Filed: Jan. 11, 2024

(86) PCT No.: PCT/EP2024/050570

§ 371 (c)(1),
(2) Date: Aug. 19, 2025

(87) PCT Pub. No.: WO2024/179729

PCT Pub. Date: Sep. 6, 2024

(65) Prior Publication Data

US 2026/0217300 A1 Jul. 30, 2026

(30) Foreign Application Priority Data

Mar. 2, 2023 (DE) ......................... 102023105162.8

(51) Int. Cl.
*B62D 1/185* (2006.01)
*B62D 1/181* (2006.01)

(52) U.S. Cl.
CPC ............. *B62D 1/185* (2013.01); *B62D 1/181* (2013.01)

(58) Field of Classification Search
CPC ................................ B62D 1/185; B62D 1/181
See application file for complete search history.

(56) References Cited

U.S. PATENT DOCUMENTS

2003/0172765 A1* 9/2003 Heiml .................... B62D 1/184 280/775
2009/0100956 A1* 4/2009 Warashina ............. B62D 1/181 74/493

(Continued)

FOREIGN PATENT DOCUMENTS

CN 118618208 A * 9/2024 ............. B62D 1/181
CN 121493083 A * 2/2026 ............. B62D 1/187

(Continued)

OTHER PUBLICATIONS

Herron et al. WO 92/16403 English Text (Year: 1992).*

(Continued)

*Primary Examiner* — Karen Beck
(74) *Attorney, Agent, or Firm* — Maier & Maier, PLLC

(57) ABSTRACT

A telescopic steering column for a motor vehicle, with a base element on which a base element spindle is mounted so as to be rotatable about a base element spindle rotation axis, and with a telescopic unit which is guided linearly with respect to the base element and which has a telescopic unit driver which has a telescopic unit driver thread which engages with a base element spindle thread of the base element spindle. The telescopic unit has a telescopic unit spindle which is drivingly connected to a transmission element which is coupled to the base element spindle in a tangential direction with respect to the base element spindle rotation axis and is guided so as to be freely displaceable on it in the axial direction with respect to the base element spindle rotation axis.

18 Claims, 2 Drawing Sheets

(56) References Cited

U.S. PATENT DOCUMENTS

| | | | | |
|---|---|---|---|---|
| 2017/0363189 | A1* | 12/2017 | Nunez | F16H 25/2006 |
| 2020/0262466 | A1* | 8/2020 | Specht | B62D 1/181 |
| 2020/0346682 | A1* | 11/2020 | Forte | B62D 5/006 |
| 2021/0229733 | A1* | 7/2021 | Kurokawa | B62D 1/184 |
| 2021/0323598 | A1 | 10/2021 | Watanabe et al. | |
| 2022/0135111 | A1 | 5/2022 | Weselý et al. | |
| 2022/0227410 | A1* | 7/2022 | Kremer | B62D 1/185 |
| 2023/0043788 | A1* | 2/2023 | Ponikiewski | B62D 1/181 |

FOREIGN PATENT DOCUMENTS

| | | | | |
|---|---|---|---|---|
| DE | 3636315 | A1 * | 4/1988 | B62D 1/181 |
| DE | 102004044472 | A1 * | 3/2006 | B62D 1/181 |
| DE | 102019217961 | A1 | 6/2020 | |
| DE | 102019214332 | A1 | 3/2021 | |
| DE | 102020129216 | A1 | 5/2021 | |
| DE | 102021125546 | A1 | 9/2022 | |
| DE | 102023105162 | A1 * | 9/2024 | B62D 1/181 |
| DE | 102024108899 | A1 * | 10/2025 | B62D 1/181 |
| EP | 834437 | A2 * | 4/1998 | |
| EP | 0752358 | B1 * | 12/1998 | B62D 1/181 |
| EP | 0858941 | B1 * | 4/2002 | B62D 1/181 |
| EP | 1767432 | A1 * | 3/2007 | B62D 1/181 |
| JP | 2018192929 | A | 12/2018 | |
| WO | WO-9216403 | A1 * | 10/1992 | B62D 1/181 |
| WO | WO-2024088458 | A1 * | 5/2024 | B62D 1/181 |

OTHER PUBLICATIONS

Lou et al. CN 118618208 English Text (Year: 2024).*

International Preliminary Report on Patentability issued on Sep. 11, 2025, in corresponding International Application No. PCT/EP2024/050570, 14 pages.

Search Report and Written Opinion issued on Apr. 26, 2024, in corresponding International Application No. PCT/EP2024/050570, 25 pages.

Research Report issued on May 16, 2023, in corresponding German Application No. 10 2023105162.8, 11 pages.

* cited by examiner

TELESCOPIC STEERING COLUMN FOR A MOTOR VEHICLE

FIELD

The invention relates to a telescopic steering column for a motor vehicle, comprising a base element on which a base element spindle is mounted so as to be rotatable about a base element spindle rotation axis, and comprising a telescopic unit which is guided linearly with respect to the base element and which has a telescopic unit driver which has a telescopic unit driver thread which engages with a base element spindle thread of the base element spindle.

BACKGROUND

The prior art includes document DE 10 2019 217 961 A1, for example. This describes a steering column assembly for a vehicle comprising a first elongate guide portion, a second portion movably mounted with respect to the elongate guide portion, and means for attaching a steering wheel to one of the first and second portions, the elongate guide portion comprising at least two elongate parallel guide edges, and the second portion comprising at least two rollers spaced apart in the longitudinal direction of the elongate guide portion and shaped complementary to and for engagement with a first of the elongate guide edges, and at least two further rollers spaced apart in the longitudinal direction of the elongate guide portion and shaped complementary to and for engagement with a second of the elongate edges.

SUMMARY

The object of the invention is to propose a telescopic steering column for a motor vehicle which has advantages over known telescopic steering columns, in particular allowing a greater travel range.

This is achieved according to the invention with a telescopic steering column for a motor vehicle. It is provided that the telescopic unit has a telescopic unit spindle which is drivingly connected to a transmission element which is coupled to the base element spindle in a tangential direction with respect to the base element spindle rotation axis and is guided on it in an axial direction with respect to the base element spindle rotation axis in a freely displaceable manner.

It is pointed out that the exemplary embodiments explained in the description are not limiting; rather, any variations of the features disclosed in the description, the claims and the figures can be implemented.

The telescopic steering column serves to hold a control element which is intended and designed for steering the motor vehicle. The control element is preferably coupled, in particular mechanically and/or electrically, to a steering gear and, via this, to rotatably suspended wheel carriers of a wheel axle of the motor vehicle. There can be a purely mechanical coupling, a purely electrical coupling or a partially mechanical and partially electrical coupling. A movement of the control element, in particular a rotational movement of the control element, causes a rotational movement of the wheel carriers and thus a steering of the motor vehicle. In the case of electrical coupling, the control element is, for example, electrically connected to a steering actuator, which ultimately causes the rotational movement of the wheel carrier. The control element is preferably in the form of a steering wheel or is at least designed in the manner of a steering wheel.

The telescopic steering column provides a great degree of freedom in the arrangement of the control element. The telescopic steering column is used to mechanically move the control element in at least one direction. For this purpose, the telescopic steering column has the base element on which the base element spindle is rotatably mounted, namely around the base element spindle rotation axis. The telescopic unit driver of the telescopic unit sits on the base element spindle, via which driver the control element is connected to the base element. The telescopic unit driver has a telescopic unit driver thread that drivingly interacts with the base element spindle thread of the base element spindle, namely it is in engagement with it. Preferably, the telescopic unit driver thread is self-locking.

Since the telescopic unit is guided linearly, namely in the axial direction with respect to the base element spindle rotation axis, a rotational movement of the base element spindle causes a linear displacement of the telescopic unit driver and thus of the entire telescopic unit. The linear guidance is implemented in particular by means of a linear guide which is located between the base element and the telescopic unit. For example, the linear guide has one or more guide webs that engage positively in one or more guide recesses, so that the base element and the telescopic unit can only be displaced linearly relative to one another, namely in the axial direction. The linear guide is designed in particular in such a way that a force acting on the control element and/or a torque acting on the control element is introduced into the base element and/or the steering shaft.

The travel distance of the telescopic steering column described so far is limited by a length of the base element spindle, i.e. by its extension in the axial direction with respect to the base element spindle rotation axis. Additionally or alternatively, the travel distance is limited by the linear guide of the telescopic unit, by means of which it is guided with respect to the base element. Since neither the base element spindle nor the linear guide can be arbitrarily large, the control element can only be moved to a limited extent. For this reason, the telescopic steering column should be designed in several stages, i.e. have a further telescopic unit which has at least the telescopic unit driver. In this case, the control element would be connected to the further telescopic unit, in particular mounted on it. The provision of the further telescopic unit with a further telescopic unit driver makes it necessary for the telescopic unit to also have a spindle, namely the telescopic unit spindle.

In order to avoid an additional drive, the telescopic unit spindle should be driven by the base element spindle and be drivingly connected to it for this purpose. For this purpose, the transmission element is arranged on the base element spindle. This causes a torque transmission between the base element spindle and the telescopic unit spindle. For this purpose, it is coupled to the base element spindle in the tangential direction or in the circumferential direction with respect to the base element spindle rotation axis. In order to be able to transmit the torque between the base element spindle and the telescopic unit spindle regardless of the position of the telescopic unit with respect to the base element, it can be freely displaced in the axial direction with respect to the base element spindle rotation axis on the base element spindle.

The transmission element moves with the telescopic unit and in particular with the telescopic unit spindle in order to ensure torque transmission regardless of the position of the telescopic unit. Particularly preferably, the transmission element is coupled to the telescopic unit, in particular the telescopic unit spindle, in the axial direction with respect to the base element spindle rotation axis, so that a displacement of the telescopic unit with respect to the base element also causes a displacement of the transmission element on the base element spindle. This can be accomplished in different ways.

The described design of the telescopic steering column enables the control element to be moved over a large travel distance by means of only a single drive, which is coupled to the base element spindle and drives it at least temporarily to move the control element. Accordingly, the described advantage of the large travel distance can be achieved with little structural and design effort. The base element is preferably attached to a steering shaft. The fastening can be rigid or adjustable. In the latter case, the telescopic steering column preferably allows height adjustment. For this purpose, the base element is mounted on the steering shaft so that it can pivot about a pivot axis. Preferably, an actuator is provided for height adjustment, which also engages the base element and is provided and designed to displace the base element with respect to the steering shaft. A further development of the invention provides that the telescopic unit spindle has a telescopic unit spindle thread with which a carrier driver thread of a carrier driver is engaged, wherein the carrier driver is part of a control element carrier on which a control element serving for steering the motor vehicle is present. The control element has already been discussed. The control element can basically be of any design. For example, it can be rotated relative to the control element carrier. In this case, the control element carrier has a bearing for the rotatable mounting of the control element.

In addition, the control element carrier has the carrier driver, which interacts with its carrier driver thread with the telescopic unit spindle thread or is in engagement with it. The control element carrier is guided linearly with respect to the telescopic unit, in particular in the axial direction with respect to a telescopic unit spindle rotation axis about which the telescopic unit spindle is rotatably mounted. As a result, a rotary movement of the telescopic unit spindle causes a linear displacement of the carrier driver and consequently of the control element carrier.

For example, the telescopic steering column has the base element, the base element spindle which is rotatably mounted on it and the telescopic unit, which in turn has the telescopic unit spindle. The carrier driver is mounted on this. Due to the driving coupling of the telescopic unit spindle with the base element spindle, a significant increase in the travel distance is achieved compared to a design without a rotatable telescopic unit spindle, in particular at least a doubling of the travel distance.

A further development of the invention provides that the control element is connected by means of a force dissipation device, so that when the control element is subjected to a force exceeding a threshold force, the force dissipation device releases the control element for free displacement with respect to the base element, in particular against a counterforce caused by the force dissipation device. The force dissipation device enables the control element to deflect towards the base element in the event of an accident in order to avoid injury to a driver of the motor vehicle. The force dissipation device is located, for example, between the control element and the control element carrier or between the control element carrier and the carrier driver or between the base element and the steering shaft. The force dissipation device is designed, for example, as a crash lug.

What is particularly important here is that in a first state of the force dissipation device, the control element or the control element carrier can be displaced exclusively by rotation of the base element spindle in the axial direction, for example by using self-locking threads, whereas in a second state of the force dissipation device, the control element or the control element carrier is released for displacement relative to the base element in the axial direction, for example for free displacement or for displacement against the counterforce caused by the force dissipation device.

In the second state, a connection between the control element and the control element carrier or a drive connection between the control element carrier and the carrier driver is thus at least partially removed in order to enable the displacement. The first state exists until the applied force exceeds the threshold force. If this is the case, a mechanical change in the force dissipation device occurs, in particular by breaking and/or deformation of a part of the force dissipation device. Subsequently, the force dissipation device is in the second state. Such a design of the telescopic steering column enables the realization of a high level of safety.

A further development of the invention provides that the telescopic unit is part of a plurality of telescopic units, wherein the telescopic unit driver thread of the telescopic unit driver of a first of the telescopic units engages with the base element spindle thread and the telescopic unit driver thread of the respective telescopic unit driver of each further of the telescopic units engages with the telescopic unit spindle thread of the telescopic unit spindle of another of the telescopic units. So there is not just the telescopic unit, but several telescopic units are part of the telescopic steering column. With each of the telescopic units, the maximum travel distance of the control element is increased.

The telescope unit already described corresponds to the first telescope unit. Its telescopic unit driver sits on the base element spindle and drivingly interacts with it in order to displace the first telescopic unit with respect to the base element spindle and to drive the first telescopic unit spindle of the first telescopic unit. A second of the telescopic units has a second telescopic unit spindle which is drivingly connected to the first telescopic unit spindle, namely via a second transmission element which is arranged on the first telescopic unit spindle.

The second transmission element is coupled to the first telescopic unit spindle in the tangential direction with respect to the first telescopic unit spindle rotation axis of the first telescopic unit spindle and is freely displaceable in the axial direction with respect to the first telescopic unit spindle rotation axis on the first telescopic unit spindle. Preferably, the carrier driver mentioned above is arranged on the second telescopic unit spindle, so that the travel distance is significantly increased.

In this way, any number of telescopic units can be present, the telescopic unit spindles of which are drivingly coupled to one another and to the base element spindle, so that they are all driven by the base element spindle or a drive that is drivingly coupled to the base element spindle. In this respect, the telescopic unit spindles are preferably driven exclusively via the base element spindle, namely by the drive. The described design of the telescopic steering column allows the travel distance for the control element to be scaled as required.

The telescopic units are guided linearly, in particular with respect to the base element and/or with respect to each other. The linear guide, which is located between the base element and the respective telescopic unit or between the telescopic units, is preferably used for this purpose. For example, the linear guide has one or more guide webs that engage positively in one or more guide recesses, so that the base element and the telescopic unit or telescopic units can only be displaced linearly relative to one another, namely in the axial direction.

A further development of the invention provides that the transmission element is part of a plurality of transmission elements and at least a plurality of the telescopic units each have one of the transmission elements, wherein the transmission elements of the telescopic units are each coupled to the telescopic unit spindle of another of the telescopic units in the tangential direction and are guided so as to be freely displaceable on it in the axial direction. This has also been already addressed. Preferably, only on the telescopic unit spindle furthest away from the base element spindle in terms of drive technology is no transmission element arranged, but instead the carrier driver. This enables the good scalability described.

A further development of the invention provides that the transmission element is rotatably mounted on the telescopic unit driver. In such a design, the transmission element is connected to the telescopic unit driver via a pivot bearing, so that the displacement of the transmission element in the axial direction is effected by the telescopic unit driver. This achieves a high degree of reliability in the displacement of the transmission element, so that a torque transmission path between the transmission element and the telescopic unit spindle can be selected essentially freely and does not have to be designed for force transmission in the axial direction.

A further development of the invention provides that the transmission element is a gear element and component of a transmission gear, wherein the gear element drivingly cooperates with a gear counter element rigidly coupled to the telescopic unit spindle, so that the telescopic unit spindle is drivingly connected to the base element spindle. The transmission gear is used to transmit torque between the telescopic unit spindle and the base element spindle, either directly or indirectly via another telescopic unit spindle. It has the transmission element and the transmission counter element, which interact drivingly. The gear element is connected to the base element spindle or the further telescopic unit spindle in a torque-transmitting manner, wherein the gear counter element is rigidly coupled to the telescopic unit spindle. With such a design of the telescopic steering column, the advantages already explained can be achieved.

A further development of the invention provides that the gear element and the gear counter element are coupled to one another in the axial direction, so that the gear counter element provides longitudinal guidance of the gear element. Preferably, in such a design of the telescopic steering column, the gear element is only indirectly connected to the telescopic unit driver. Rather, the gear counter element is rotatably mounted on the telescopic unit driver, in particular via the telescopic unit spindle. The guidance of the gear element in the axial direction is carried out by the gear counter element, namely by the gear element and the gear counter element being coupled to each other in the axial direction. For this purpose, for example, the gear counter element encompasses the gear element in the axial direction on both sides, so that it carries the gear element along when it is displaced in the axial direction. Other connections between the gear element and the gear counter element can also be implemented as long as they effect the coupling in the axial direction. The described design of the telescopic steering column allows a high degree of freedom with regard to the design of the transmission gear.

A further development of the invention provides that the transmission gear is designed as a gear train or as a traction mechanism transmission. In the first case, the transmission element and the transmission counter element are designed, for example, as gears or drive wheels. In the latter case, the transmission element and the transmission counter element are arranged as wheels arranged at a distance from each other and drivingly connected to each other by means of a traction means. The traction device is preferably a drive belt or a chain. While the two shafts are coupled to each other in a particularly torsionally rigid manner via the gear train, the traction means gear allows a particularly flexible arrangement of the shafts.

A further development of the invention provides that the transmission gear has a ratio of one or a ratio deviating from one. In principle, the transmission ratio can be chosen arbitrarily. In the case of multiple transmission gears of multiple telescopic units, the transmission ratios are preferably selected such that the telescopic units travel their respective maximum travel distance in the same time. This means that when the control element is moved, the telescopic units have traveled their entire travel distance at the same time or have traveled through it over the same period of time. This makes it possible, for example, to design the telescopic units with different travel distances and yet still utilize the entire travel distance.

A further development of the invention provides that the transmission element has a form-fitting device which interacts positively with a form-fitting counter device of the base element spindle or of the telescopic unit spindle of the other telescopic unit. To fix the transmission element with respect to the base element spindle or the telescopic unit spindle, the form-fitting device and the form-fitting counter device interact with each other in a form-fitting manner. The form-fitting device is a component of the transmission element, while the form-fitting counter device is formed on the base element spindle or the telescopic unit spindle. The positive interaction takes place in such a way that the transmission element is positively coupled to the base element spindle or the telescopic unit spindle in a tangential direction and is freely displaceable in the axial direction. This design enables the advantages already explained.

A further development of the invention provides that the form-fitting device has at least one form-fitting projection and the form-fitting counter device has at least one form-fitting recess which positively receives the at least one form-fitting projection. The form-fitting projection engages in the form-fitting recess. If there are multiple form-fitting projections, they are arranged at a distance from one another, in particular in the circumferential direction. In addition, each of the plurality of form-fitting projections engages in one of a plurality of form-fitting recesses, in particular in each of the form-fitting recesses of one of the plurality of form-fitting projections. This ensures reliable torque transmission between the transmission element and the respective spindle.

The features and feature combinations described in the description, in particular the features and feature combinations described below in the description of the figures and/or shown in the figures may be used not only in the respective specified combination, but also in other combinations or alone, without departing from the scope of the invention. The invention should therefore also be considered to comprise embodiments that are explicitly not shown or explained in the description and/or the figures, but emerge from the explained embodiments or can be derived from them.

BRIEF DESCRIPTION OF THE FIGURES

In the following, the invention will be explained in greater detail with reference to the exemplary embodiments depicted in the drawings, without this limiting the invention. In particular.

DETAILED DESCRIPTION

Figure 1:
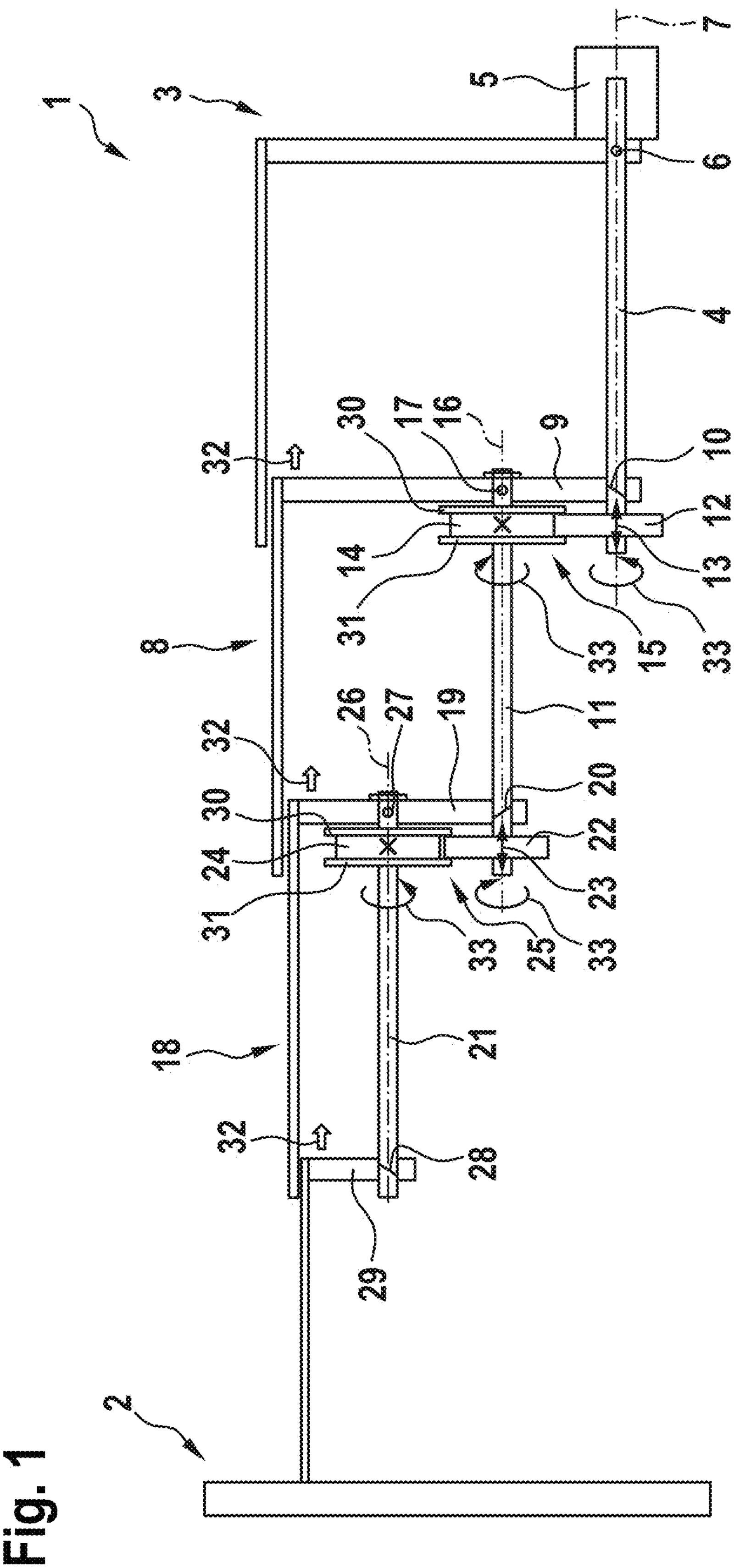
FIG. 1 is a schematic representation of a telescopic steering column for a motor vehicle in a first embodiment.

FIG. 1 shows a schematic representation of a first embodiment of a telescopic steering column 1 for supporting a control element 2 for steering a motor vehicle with respect to a base element 3. The base element 3 is preferably arranged between a bulkhead and a dashboard of the motor vehicle, in particular in front of a driver's seat. A base element spindle 4 is rotatably mounted on the base element 3. The base element spindle 4 is drivingly connected to a drive 5, which contains, for example, an electric motor, in particular designed as a gear motor. The base element spindle 4 is rotatably mounted on the base element 3 about a base element spindle rotation axis 7 by means of a bearing 6, which is only indicated here.

Furthermore, the telescopic steering column 1 has a first telescopic unit 8, which has a telescopic unit driver 9, which has a-preferably self-locking-telescopic unit driver thread, which engages with a merely indicated base element spindle thread 10 of the base element spindle 4. Furthermore, the first telescopic unit 8 has a first telescopic unit spindle 11, which is drivingly connected to the base element spindle 4, namely via a first transmission element 12 which is arranged on the base element spindle 4. The first transmission element 12 is coupled to the base element spindle 4 in the tangential direction with respect to the base element spindle rotation axis 7 and is freely displaceable relative to it in the axial direction, as indicated by the double arrow 13.

The first transmission element 12 is present as a first gear element and, together with a first gear counter element 14, is part of a first transmission gear 15. The first gear counter element 14 is fixedly coupled to the first telescopic unit spindle 11, as indicated by the symbol "X". The first telescopic unit spindle 11 is in turn rotatably mounted about a first telescopic unit spindle rotation axis 16 on the first telescopic unit driver 9, namely by means of a bearing 17 which is only indicated here.

In addition, a second telescopic unit 18 is part of the telescopic steering column 1. The second telescopic unit 18, analogous to the first telescopic unit 8, has a second telescopic unit driver 19 which engages with a first telescopic unit spindle thread 20 by means of a preferably self-locking telescopic unit driver thread. The second telescopic unit 18 further comprises a second telescopic unit spindle 21, which is drivingly coupled to the first telescopic unit spindle 11 via a second transmission element 22 and, via the latter, to the base element spindle 4.

The second transmission element 22 is fixed to the first telescopic unit spindle 11 in the tangential direction with respect to the first telescopic unit spindle rotation axis 16, but is displaceable in the axial direction with respect thereto, as indicated by the arrow 23. The second transmission element 22 is a gear element which interacts with a second gear counter element 24. The second transmission element 22 and the second gear counter element 24 are components of a second transmission gear 25. The second gear counter element 24 is rigidly coupled to the second telescopic unit spindle 21, as again indicated by the symbol "X". The second telescopic unit spindle 21 is mounted on the second telescopic unit driver 19 so as to be rotatable about a second telescopic unit spindle rotation axis 26, namely by means of a bearing 27 which is again only indicated.

The second telescopic unit spindle 21 has a second telescopic unit spindle thread 28, only indicated here, which engages with a-preferably self-locking-carrier driver thread of a carrier driver 29. The control element 2 is in turn arranged on the carrier driver 29 or is connected to it. For example, an actuator is arranged on the carrier driver 29, to which the control element 2 is connected. By means of the actuator, a force or torque can be exerted on the control element 2. Preferably, the actuator is designed as a feedback actuator in order to provide the driver of the motor vehicle with feedback about a current driving state of the motor vehicle. A linear guide, by means of which the carrier driver 29 is guided in a linearly displaceable manner with respect to the base element 3, is preferably designed such that it transfers a torque generated by the actuator into the base element 3.

A displacement of the first transmission element 12 and the second transmission element 22 in the axial direction on the respective spindle 4 and 11 is effected by the gear counter elements 14 and 24. In the illustrated exemplary embodiment, the transmission counter elements 14 and 24 each have driver walls 30 and 31, which receive the respective transmission element 12 or 22 between them and guide it in the axial direction.

Purely by way of example, a retraction of the telescopic steering column 1 is shown, in which the first telescopic unit driver 9, the second telescopic unit driver 19 and the carrier driver 29 are each displaced in the direction of the arrows 32. This results in rotational movements of the spindles 4, 11 and 21, which are indicated by the arrows 33.

Figure 2:
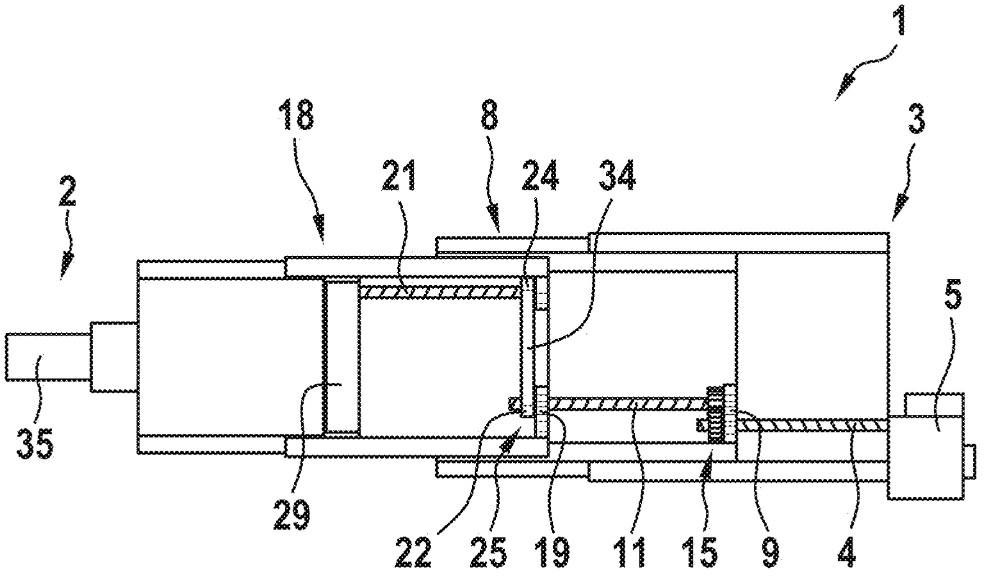
FIG. 2 is a schematic representation of the telescopic steering column in a second embodiment.

FIG. 2 shows a schematic representation of the telescopic steering column 1 in a second embodiment. This embodiment is essentially similar to the first embodiment, so that reference is made to the entirety of the previous corresponding statements and only the differences are pointed out below. These consist in that the first transmission gear 15 is again designed as a gear transmission, in particular as a toothed transmission. The second transmission gear 25, on the other hand, is a traction transmission. The second gear element 22 and the second gear counter element 24 are designed as wheels which are drivingly connected to one another via a traction means 34, for example a belt. Only a shaft 35 of the control element 2 is indicated here. In principle, the transmission gears 15 and 25 can be of the same type or of different types. Both can therefore be in the form of a gear train or a traction mechanism, or one can be in the form of a gear train and the other can be in the form of a traction mechanism.

Figure 3:
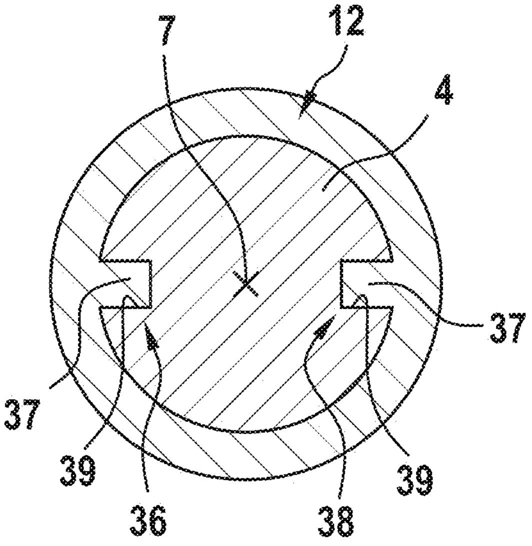
FIG. 3 is a schematic representation of a section through a region of the telescopic steering column.

FIG. 3 shows a detailed sectional view of a region of the telescopic steering column 1, namely through the base element spindle 4 and the first transmission element 12. It can be seen that the transmission element 12 has a form-fitting device 36, which in the exemplary embodiment shown here has 2 form-fitting projections 37. On the base element spindle 4, on the other hand, a form-fitting counter device 38 is provided, which has two form-fitting recesses 39. Each of the form-fitting projections 37 engages in one of the form-fitting recesses 39 in order to fix the first transmission element 12 in the circumferential direction or tangential direction with respect to the base element spindle rotation axis 7 and to release it for displacement in the axial direction. The first telescopic unit spindle 11 and the second transmission element 22 are preferably designed analogously.

The described design of the telescopic steering column 1 enables a particularly large travel distance due to its multi-stage structure while at the same time being simple and cost-effective. In order to achieve this, the base element spindle 4, the first telescopic unit spindle 11 and the second telescopic unit spindle 21 can be driven by means of the same drive 5, namely the first telescopic unit spindle 11 via the base element spindle 4 and the second telescopic unit spindle 21 via the first telescopic unit spindle 11 and the base element spindle 4.

LIST OF REFERENCE NUMERALS

1 telescopic steering column
2 control element
3 base element
4 base element spindle
5 drive
6 bearing
7 base element spindle rotation axis
8 1. telescopic unit
9 1. telescopic unit driver
10 base element spindle thread
11 1. telescopic unit spindle
12 1. transmission element
13 arrow
14 1. gear counter element
15 1. transmission gear
16 1. telescopic unit spindle rotation axis
17 bearing
18 2. telescopic unit
19 2. telescopic unit driver
20 1. telescopic unit spindle thread
21 2. telescopic unit spindle
22 2. transmission element
23 arrow
24 2. gear counter element
25 2. transmission gear
26 2. telescopic unit spindle rotation axis
27 bearing
28 2. telescopic unit spindle thread
29 carrier driver
30 driver wall
31 driver wall
32 arrow
33 arrow
34 traction device
36 form-fitting device
37 form-fitting projection
38 form-fitting counter device
39 form-fitting recess

The invention claimed is:

1. A telescopic steering column for a motor vehicle, comprising:

a base element on which a base element spindle is mounted so as to be rotatable about a base element spindle rotation axis, and a telescopic unit which is guided linearly with respect to the base element and which has a telescopic unit driver having a telescopic unit driver thread that engages with a base element spindle thread of the base element spindle, wherein the telescopic unit has a telescopic unit spindle which is drivingly connected to a transmission element which is coupled to the base element spindle in a tangential direction with respect to the base element spindle rotation axis and is guided so as to be freely displaceable on the base element spindle in the axial direction with respect to the base element spindle rotation axis, wherein the transmission element includes a form-fitting device having at least one form-fitting projection, wherein the base element spindle includes a form-fitting counter device having at least one form-fitting recess configured to receive the at least one form-fitting projection, and wherein the form-fitting device and the form-fitting counter device are configured to positively couple the transmission element to the base element spindle in the tangential direction while permitting displacement of the transmission element relative to the base element spindle in the axial direction.

2. The telescopic steering column according to claim 1, wherein the telescopic unit spindle has a telescopic unit spindle thread with which a carrier driver thread of a carrier driver is engaged, wherein the carrier driver is part of a control element carrier on which a control element serving to steer the motor vehicle is present.

3. The telescopic steering column according to claim 1, wherein the telescopic unit is part of a plurality of telescopic units, wherein the telescopic unit driver thread of the telescopic unit driver of a first of the telescopic units engages with the base element spindle thread and the telescopic unit driver thread of the respective telescopic unit driver of each further one of the telescopic units engages with the telescopic unit spindle thread of the telescopic unit spindle of another of the telescopic units.

4. The telescopic steering column according to claim 1, wherein the telescopic unit is part of a plurality of telescopic units, wherein the transmission element is part of a plurality of transmission elements and at least a plurality of the telescopic units each have one of the transmission elements, wherein the transmission elements of the telescopic units are each coupled in a tangential direction to the telescopic unit spindle of another of the telescopic units and are guided so as to be freely displaceable in the axial direction thereon.

5. The telescopic steering column according to claim 1, wherein the transmission element is rotatably mounted on the telescopic unit driver.

6. The telescopic steering column according to claim 1, wherein the transmission element is a gear element and part of a transmission gear, wherein the gear element cooperates drivingly with a gear counter element rigidly coupled to the telescopic unit spindle, so that the telescopic unit spindle is drivingly connected to the base element spindle.

7. The telescopic steering column according to claim 6, wherein the gear element and the gear counter element are coupled to one another in the axial direction, so that the gear counter element provides longitudinal guidance for the gear element.

8. The telescopic steering column according to claim 6, wherein the transmission gear is designed as a gear train or as a traction mechanism transmission.

9. The telescopic steering column according to claim 2, wherein the telescopic unit is part of a plurality of telescopic units, wherein the telescopic unit driver thread of the telescopic unit driver of a first of the telescopic units engages with the base element spindle thread and the telescopic unit driver thread of the respective telescopic unit driver of each further one of the telescopic units engages with the telescopic unit spindle thread of the telescopic unit spindle of another of the telescopic units.

10. The telescopic steering column according to claim 2, wherein the telescopic unit is part of a plurality of telescopic units, wherein the transmission element is part of a plurality of transmission elements and at least a plurality of the telescopic units each have one of the transmission elements, wherein the transmission elements of the telescopic units are each coupled in a tangential direction to the telescopic unit spindle of another of the telescopic units and are guided so as to be freely displaceable in the axial direction thereon.

11. The telescopic steering column according to claim 3, wherein the transmission element is part of a plurality of transmission elements and at least a plurality of the telescopic units each have one of the transmission elements, wherein the transmission elements of the telescopic units are each coupled in a tangential direction to the telescopic unit spindle of another of the telescopic units and are guided so as to be freely displaceable in the axial direction thereon.

12. The telescopic steering column according to claim 2, wherein the transmission element is rotatably mounted on the telescopic unit driver.

13. The telescopic steering column according to claim 3, wherein the transmission element is rotatably mounted on the telescopic unit driver.

14. The telescopic steering column according to claim 4, wherein the transmission element is rotatably mounted on the telescopic unit driver.

15. The telescopic steering column according to claim 2, wherein the transmission element is a gear element and part of a transmission gear, wherein the gear element cooperates drivingly with a gear counter element rigidly coupled to the telescopic unit spindle, so that the telescopic unit spindle is drivingly connected to the base element spindle.

16. The telescopic steering column according to claim 3, wherein the transmission element is a gear element and part of a transmission gear, wherein the gear element cooperates drivingly with a gear counter element rigidly coupled to the telescopic unit spindle, so that the telescopic unit spindle is drivingly connected to the base element spindle.

17. The telescopic steering column according to claim 4, wherein the transmission element is a gear element and part of a transmission gear, wherein the gear element cooperates drivingly with a gear counter element rigidly coupled to the telescopic unit spindle, so that the telescopic unit spindle is drivingly connected to the base element spindle.

18. The telescopic steering column according to claim 5, wherein the transmission element is a gear element and part of a transmission gear, wherein the gear element cooperates drivingly with a gear counter element rigidly coupled to the telescopic unit spindle, so that the telescopic unit spindle is drivingly connected to the base element spindle.

* * * * *